United States Patent [19]

Cox et al.

[11] 3,961,084

[45] June 1, 1976

[54] RICE-TREATING METHOD AND RICE PRODUCTS

[75] Inventors: James Patrick Cox; Jeanne Marie Cox, both of Lynden, Wash.

[73] Assignee: Martin, Robertson & Bain Ltd., Vancouver, Canada

[22] Filed: Oct. 10, 1974

[21] Appl. No.: 513,709

Related U.S. Application Data

[63] Continuation-in-part of Ser. No. 131,423, April 5, 1971, Pat. No. 3,879,566.

[52] U.S. Cl................................. 426/93; 426/289
[51] Int. Cl.[2]............................................ A23B 9/00
[58] Field of Search..................... 426/93, 289, 331

[56] References Cited
UNITED STATES PATENTS

| | | | |
|---|---|---|---|
| 3,620,762 | 11/1971 | Yoshida et al. | 426/93 X |
| 3,879,566 | 4/1975 | Cox et al. | 426/93 X |

*Primary Examiner*—James R. Hoffman
*Attorney, Agent, or Firm*—Robert W. Beach

[57] ABSTRACT

Various varieties of rice are subjected to heat treatment either by torrefaction in the presence of some water, by steaming, or by boiling, the water in each instance containing dissolved chemicals, for the purpose of modifying the protein content and the starch content to condition the product for subsequent accelerated water imbibation during final cooking for eating. Chemicals for such purpose are citrates, including sodium citrate, magnesium citrate and calcium citrate, and alkali metal phosphates, including orthophosphates, metaphosphates, and pyrophosphates. Calcium chloride reduces the temperature of heat treatment required and deters adhesion between the grains. Calcium chloride carried by the rice grains deters loss of moisture from the grains during storage irrespective of the type of treatment to which the grains have been subjected otherwise.

4 Claims, No Drawings

RICE-TREATING METHOD AND RICE PRODUCTS

This application is a continuation in part of the U.S. Pat. application of James Patrick Cox and Jeanne Marie Cox Ser. No. 131,423, filed Apr. 5, 1971, for Quick-Cooking Rice and Rice Products and Method of Making the Same, issued Apr. 22, 1975, as a U.S. Pat. No. 3,879,566.

BACKGROUND OF THE INVENTION

1. Field of the Invention

This invention relates to the treatment of rice, and the term "rice" as used in the following description means threshed rice grain.

2. Prior Art

Various types of quick-cooking rice have been produced heretofore. By some processes the physical characteristics of the rice grains are altered, such as by fracturing them without disintegration in an effort to facilitate penetration of water into the interior of the grain for imbibation during final cooking. Such physical modification of rice grains detracts from the appearance of the rice, results in loss of nutrient values and is a comparatively expensive process to perform. Another proposal for preparation of quick-cooking rice is that the pregelatinization and expanded grain fixation, which process includes cooking rice at the factory to a condition of virtually complete gelatinization, followed by a drying operation by which a major portion of the imbibed water used for gelatinization is removed coupled with a puffing effect or an attempt to maintain the grains in expanded condition. The theory of such a pregelatinizing operation apparently is that after rice grains have once been expanded by gelatinization they will imbibe water more readily during the final cooking operation if the expanded condition produced can be retained. Such process requires the use of expensive equipment.

In preparing quick-cooking rice according to the invention of U.S. Pat. No. 3,879,566 the rice grains are not subjected to mechanical action to modify their physical structure. Neither is reliance placed on bloating the rice grains followed by drying them in a manner to retain their expanded condition so as to facilitate subsequent water imbibation during final cooking. Instead, that invention relies on molecular or internal structural modification of the rice grain chemical components accomplished by the use of chemicals and heat treatment to facilitate penetration of water into the rice grains to expedite imbibation of the water during preparation of the quick-cooking rice and also during its final cooking to palatable condition.

SUMMARY OF THE INVENTION

A principal object of the invention is to deter loss of moisture from quick-cooking rice or from conventional milled rice to reduce weight loss during storage.

DETAILED DESCRIPTION

Calcium chloride provides the benefit of serving as a humectant to deter loss of moisture from threshed rice grain dried to a range of 12% to 15% moisture content of the dry rice by weight and thus reduce weight loss of the rice appreciably below this moisture content during storage. For this purpose the calcium chloride can be supplied in conjunction with preparation of quickcooking rice either during a rinsing operation or a precooking operation.

Alternatively, to deter loss of moisture from rice grain which has not been treated to reduce its final cooking time, rice grain dried to a moisture content of 12% to 15% of the dry rice by weight can be treated during the milling process with a mixture of calcium chloride, glucose and talc. It is customary to apply a coating of glucose and/or talc to rice in revolving tumblers. Following the tumbling the rice is screened to remove the excess glucose and/or talc which does not adhere to the rice grains. A mixture of equal parts of talc and glucose can be used for the coating preparation in which the talc powder particles will be 1 to 2 microns in size, and the glucose particles can be 5 to 50 microns in size. Where calcium chloride powder is used in the coating preparation, its particles are from 1 to 10 microns in size. The coating preparation can include approximately equal parts of calcium chloride, glucose and talc by weight, or approximately equal parts of calcium chloride and glucose by weight, or approximately equal parts of calcium chloride and talc by weight. Alternatively, powdered calcium chloride alone can be used. In all instances the coating preparation will increase the whiteness and luster of the rice grains. Moreover, the calcium chloride will serve as a humectant to stabilize the moisture content of the rice within the range of 12% to 15% of the dry rice by weight, preferably approximately 13% by weight.

The amount of dusting preparation used could be approximately 1% by weight of the rice grain in the tumblers, and the amount of coating material which will adhere to the rice grains after screening to separate excess coating material from the rice grains may be approximately 0.01% by weight. It is believed that the calcium chloride deters loss of moisture from the rice grain by absorbing moisture from the air to provide a moist protective coating on each rice grain which will virtually eliminate the tendency of moisture to migrate from the interior of the rice grain to dry surrounding atmosphere. Also the calcium chloride adhering to the rice grain provides a nontoxic calcium fortification for the rice.

We claim:

1. The method of deterring loss of moisture from rice grains and thereby reducing weight loss of the rice during storage which comprises supplying calcium chloride to threshed rice grain prior to storage, for such calcium chloride to be carried by the grains of the rice during storage.

2. The method of deterring loss of moisture from rice grains and thereby reducing weight loss of the rice during storage which comprises drying threshed rice grain to a moisture content within the range of 12% to 15% of the dry rice by weight, and coating such rice grain prior to storage with calcium chloride powder to be carried by the grains of the rice for deterring escape of moisture from the rice grains which would cause weight loss of the rice during storage.

3. A rice product comprising rice grains carrying calcium chloride for deterring escape of moisture from the rice grains which would cause weight loss of the rice during storage.

4. A rice product comprising rice grains dried to a moisture content within the range of 12% to 15% of the dry rice by weight and carrying a coating of powdered calcium chloride for deterring escape of moisture from the rice grains which would cause weight loss of the rice during storage.

* * * * *